United States Patent

James

Patent Number: 6,035,376
Date of Patent: Mar. 7, 2000

[54] SYSTEM AND METHOD FOR CHANGING THE STATES OF DIRECTORY-BASED CACHES AND MEMORIES FROM READ/WRITE TO READ-ONLY

[75] Inventor: David V. James, Palo Alto, Calif.

[73] Assignee: Apple Computer, Inc., Cupertino, Calif.

[21] Appl. No.: 08/967,342

[22] Filed: Oct. 21, 1997

[51] Int. Cl.[7] .................................................. G06F 12/14
[52] U.S. Cl. .......................... 711/145; 711/103; 711/144; 711/163
[58] Field of Search .................................. 711/102, 103, 711/144, 145, 163, 156

[56] References Cited

U.S. PATENT DOCUMENTS

| | | | |
|---|---|---|---|
| 5,023,854 | 6/1991 | Satoh et al. ................................ | 369/32 |
| 5,463,759 | 10/1995 | Ghosh et al. ............................. | 711/134 |
| 5,469,555 | 11/1995 | Ghosh et al. ............................. | 711/133 |
| 5,956,754 | 9/1999 | Kimmel .................................... | 711/206 |

Primary Examiner—B. James Peikari
Attorney, Agent, or Firm—Fenwick & West LLP

[57] ABSTRACT

A system for converting between the states of fresh and owned in a multi-processor computer system comprises a memory line with a structure including a first field for storing a memory state, a second field for storing an address, and a third field for storing data. Each of the cache lines for processors in the system includes a plurality of data fields including one for storing the cache line state, one for storing a forward pointer, one for storing a backward pointer, and one for storing data. A method is also provided for automatically washing memory lines. The system is advantageous because it allows the data to be transferred immediately when it is available, rather than requiring the next cache-line owner to poll until the data is available. Still more particularly, the present invention provides a method of reliably converting an owned data line from stale to fresh when read fresh accesses are being performed, while correctly leaving the line in an owned state if additional read owned access occur. The present invention maximizes the efficiency of memory by maintaining a fresh copy of the data line when the data is only being read, and maintaining an owned copy of the data line when the data is being read and written.

12 Claims, 15 Drawing Sheets

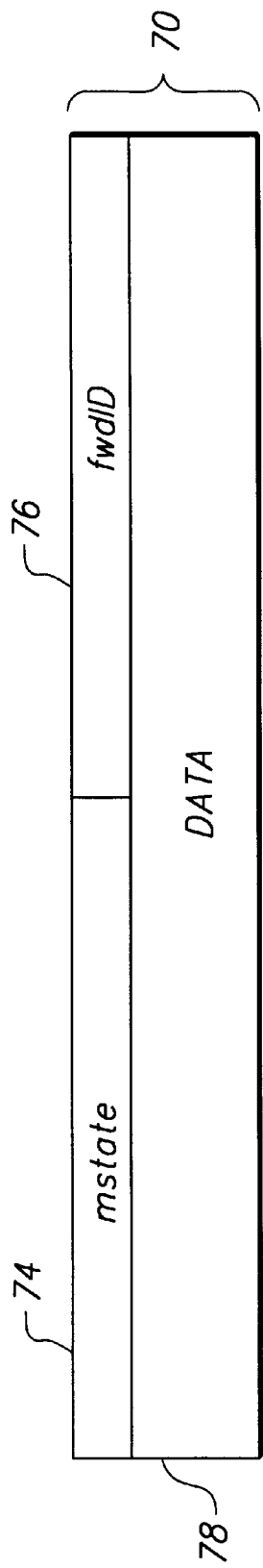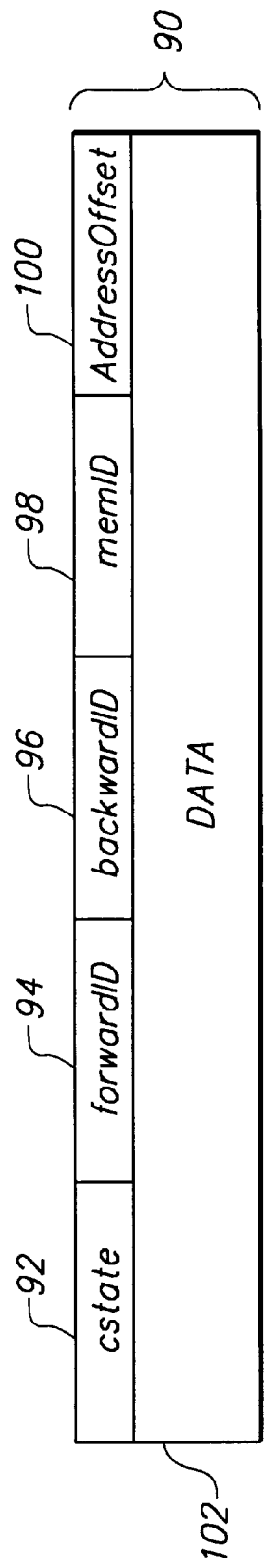
FIG. 2A
FIG. 2B

SYSTEM AND METHOD FOR CHANGING THE STATES OF DIRECTORY-BASED CACHES AND MEMORIES FROM READ/WRITE TO READ-ONLY

CROSS-REFERENCE TO RELATED APPLICATION

This application relates to U.S. patent application Ser. No. 08/342,131, filed on Nov. 18, 1994 and entitled "A System And Method For Implementing Cache Tags In Memories For Multiple Processor Computer Systems," which is incorporated herein by reference.

BACKGROUND OF THE INVENTION

1. Field of the Invention

The present invention relates generally to computer systems having a memory and multiple processors with caches. In particular, the present invention relates to a system and method for maintaining cache coherence that is event driven and changes the state of the caches and memories based on the current memory state and a head of a list of corresponding cache entries.

2. Description of the Background Art

The use of multiple processors is a recent trend in computer design. The processors used in the multi-processor architectures generally each have a dedicated cache. A cache is a relatively small group, when compared to shared memories, of high speed memory cells that are specifically dedicated to a processor. A processor's cache may be on the processor chip itself or may be on separate chips.

Processors use caches to hold data that the processor has recently accessed. A memory access is any action, such as a read or a write, where a processor receives, modifies, or receives as well as modifies the contents of a memory location. Generally, a processor can access data in its cache faster than it can access data in the main memory of the computer. By using data in its cache, a processor does not use the bus of the computer system to access data. This leaves the bus free for use by other processors and devices.

A particular problem associated with the use of caches is that the data becomes "stale." A first processor may access data in the main memory and copy the data into its cache. The first processor may then modify the data in its cache. At the instant when the data in the cache of the first processor is modified, the corresponding data in the memory is stale. If a second processor subsequently accesses the original data in the main memory, the second processor does not find the most current version of the data. The most current version is in the cache of the first processor.

A prior art solution to this problem is for processors and caches to eavesdrop or snoop on the bus. When the first processor detects the main memory access by the second processor for data that the first processor holds in its cache, the first processor inhibits the main memory and supplies the data to the second processor. In this way, a processor always receives the most current version of the data. However, this prior art solution suffers from a number of problems. Computer architectures are moving to multiple-processor, multiple-bus configurations, and for efficiency purposes, many signals on a bus are not transmitted across the interface to other busses. Among signals, which are not transmitted across the interface, are memory access signals where the path between source and target devices does not cross the interface. When devices do not transmit all memory access signals over its data path, it is impossible for processors, which are not the source and target, to eavesdrop on memory accesses and therefore, impossible to determine when the data is stale. Furthermore, decreases in access time of main memories and increases in the size of caches have created other problems with eavesdropping. Processors, with large caches, cannot access the larger cache fast enough to make the prior art solution workable unless other memory accesses are delayed while eavesdropping is performed. Thus, for a number of reasons, this prior art solution is not effective.

A second prior art solution is to provide directory structures in memories. The directory structures are used to provide pointers to the locations storing the current versions of the data, and are often referred to as memory or cache tags. A memory tag is associated with a memory address or line whose data is held in a cache. Similarly, a cache tag is associated with a cache line and can indicate the cache line of another processor where the data is held. When a processor copies the data at that address into its cache, a memory tag is updated to identify the processor in whose cache the data is held. If a second processor attempts to access the data in the memory, the processor will receive the memory tag which redirects the second processor to fetch the data from the first processor cache. More specifically, each tag cell is more than one bit wide and contains data that indicates if the data held in the corresponding memory line is valid data or if a cache of a processor holds the data. The memory tags can indicate that there are multiple read-only copies of the memory line in the caches of other processors (this state is referred to as "FRESH"), or that there is a modifiable copy of the data in the memory line (this state is referred to as "OWNED"). Fresh data may also be referred to as "unowned" data. Cache tags operate in a similar manner. Thus, memory and cache tags remove the need for eavesdropping. However, one problem with existing directory structures and protocols for memory is that they are not optimized for the particular use or operation of the memory which can change over time. The fresh state is most efficient when data is only being read; and the owned state is most efficient when data is likely to be written. Therefore, existing directory structures for memory and cache do not provide an effective means for converting the memory state from fresh to owned and vice versa.

Therefore, there is a continuing need for a system and method for ensuring that processors receive fresh data and for converting between the states of fresh and owned. In other words, there is a need for a system and method for automatically washing (converting a memory state from owned to fresh) cache and memory lines.

SUMMARY OF THE INVENTION

The present invention overcomes the deficiencies and limitations of the prior art with a system and method for converting between the states of fresh and owned in a multi-processor computer system. The present invention advantageously provides a method for automatically washing cache and memory lines without using a backward pointer value in the cache. This is particularly advantageous because it allows backward pointer storage to be used for other purposes. The alternate system is also advantageous because the backward pointer storage can be used to allow the data to be transferred immediately when it is available, rather than requiring the next cache-line owner to poll until the data is available. Still more particularly, the present invention provides a method of reliably converting an owned data line to fresh when read fresh accesses are being performed, while correctly leaving the line in an owned state if additional read owned access occur. Thus, the present invention maximizes the efficiency of memory by maintaining a fresh copy of the data line when the data is only being read, and maintaining an owned copy of the data line when the data is being read and written.

BRIEF DESCRIPTION OF THE DRAWINGS

FIG. 2A is a block diagram of a memory line constructed and structured according to the present invention;

FIG. 2B is a block diagram of a cache line constructed and structured according to the present invention;

DETAILED DESCRIPTION OF THE PREFERRED EMBODIMENTS

Figure 1:
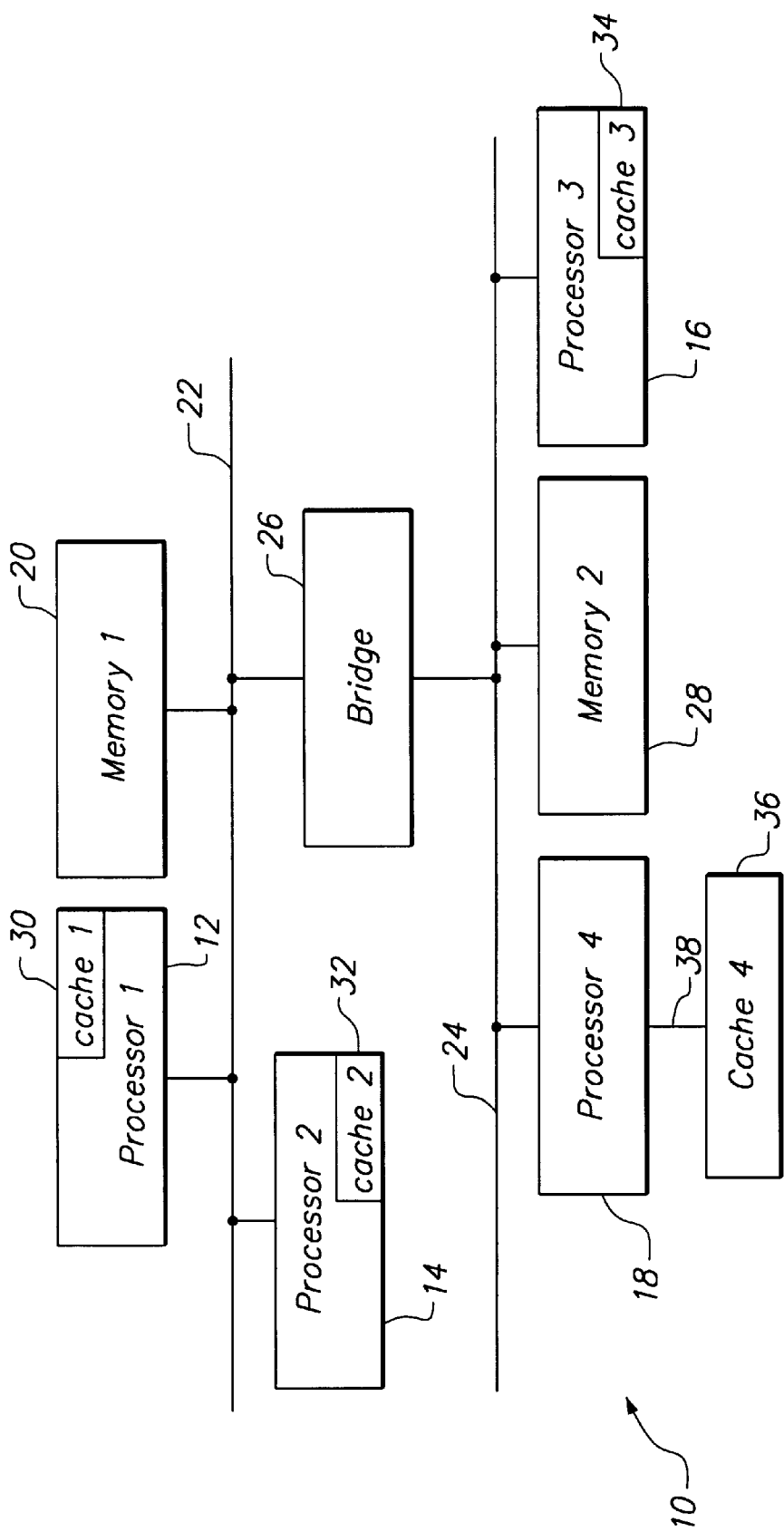
FIG. 1 is a block diagram of an exemplary multi-processor, multi-bus computer system.

Referring now to FIG. 1, a block diagram of a computer system 10 is shown. While the system 10 will now be described with reference to four processors, those skilled in the art will realize that the present invention applies to any system having a plurality of processors. The computer system 10 comprises a first processor 12, a second processor 14, a third processor 16, a fourth processor 18, a first memory 20 and a second memory 28. The first processor 12, second processor 14, and first memory 20 are coupled by a first bus 22, and the third processor 16, fourth processor 18 and second memory 28 are coupled by a second bus 24. The first bus 22 and the second bus 24 are coupled by a bridge 26. The bridge 26 is used to selectively pass control signals and data to from the first bus 22 to the second bus 24 and vice versa.

In an exemplary embodiment, the processors 12, 14, 16, 18 are PowerPC processors from Motorola Corporation of Schaumberg, Ill. The processors 12, 14, 16, 18 may alternately be Alpha Processors from the Digital Equipment Corporation of Maynard, Mass. or any other microprocessor capable of being used in a multi-processor computer system. The first processor 12, second processor 14 and third processor 16 each has an integrated cache 30, 32 and 34, respectively. An integrated cache 30, 32, 34 is a group of memory cells that are integrated into the same circuit or chip as the processor 12, 14, 16. The fourth processor 18 has an off chip cache 36. The off chip cache 36 is integrated in a separate circuit and is coupled to the fourth processor 18 by a line 38. Those skilled in the art will realize that the present invention may be used with a variety of other types of cache configurations including but not limited to in-line caches that are coupled between the processor and the bus. Each cache 30, 32, 34, 36 holds data for its processor 12, 14, 16, 18. Each processor 12, 14, 16, 18 can generally access data in its cache 30, 32, 34, 36 faster than it can access data in the memory 20, 28. Furthermore, by accessing data in its cache 30, 32, 34, 36, a processor 12, 14, 16, 18 does not utilize the bus 22, 24. Thus, leaving the bus 22, 24 free for use by other devices. Those skilled in the art will recognize that other memory access devices such as direct memory access (DMA) capable input/output (I/O) devices behave like a processor. In addition, those skilled in the art will recognize that there are other ways to connect a cache memory to a processor.

The bridge 26 is preferably a pair of conventional interfaces similar to IEEE Std 1596 Scalable Coherent Interfaces. The bridge 26 does not transmit memory access commands for which the processors on the other bus are not in the transfer path. For example, the bridge 26 does transfer memory access commands from the third processor 16 or the fourth processor 18 to the memory 20 since the path between processors 16, 18 and memory 20 is through the bridge 26. The bridge 26, however, would not transmit memory access commands from the first processor 12 or second processor 14 to memory 20 since the bridge 26 is not in the path between these processors 12, 14 and the memory 20. Thus, the third processor 16 and fourth processor 18 cannot eavesdrop on accesses of the memory 20 by the first processor 12 or the second processor 14.

The memory 20 comprises random access memory ("RAM"). The memory 20 holds data and program instruction steps for the processors 12, 14, 16, 18. The memory 20 preferably comprises a data storage and a memory controller of a conventional type. The data storage comprises a plurality of memory lines 70. Each memory line 70 has an address and the data storage includes N memory lines 70. A preferred embodiment for each memory line 70 constructed according to the present invention is shown in FIG. 2A. Each memory line 70 preferably comprises a first field 74, a second field 76, and a third field 78. The first field 74 is used to store the state of the corresponding memory line (mstate). The memory line 70 may have one of several states identified and defined in Appendix A. The most notable for the present invention being FRESH (meaning multiple copies may exist that are not modifiable and the same as memory) and STALE (meaning another copy of the data exists in a sharing list owned by another processor and it may be different from the data stored at the memory line. The second field 76 is used to store a pointer (fwdID) to another address that holds a read/write or a read-only copy of the data for the memory line 70. The third field 78 is used to store the data of the memory line 70. This structure for the memory line 70 advantageously allows the memory lines 70 to be converted from a read-only or read/write status according to the uses of the processors 12, 14, 16, 18 and according to the present invention.

Referring now to FIG. 2B, a preferred embodiment for the cache lines 90 are also shown. As has been noted above, each of the processors 12, 14, 16, 18 has a corresponding cache 30, 32, 34, 36, 38. Each of the caches 30, 32, 34, 36, 38 has a plurality of lines 90 that may be used to store owned or fresh copies of a memory line 70. Each of the cache lines 90 preferably has a plurality of fields, preferably six. A first field 92 is used to store a cache state (cstate). A second field 94 is used to store a pointer (forwardID) to another line 90 storing the same memory line 70. A third field 96 is used to store a pointer (backwardID) to another cache line 90 storing the same memory line 90. Through use of the second field 94 and third field 96, a double-linked list of cache lines 90 storing the data of the same memory line may be maintained. A fourth field 98 is used to store a pointer (memID) to a memory 20, 28 to which the data being stored in the cache line 70 corresponds. A fifth field 100 is used to store an address offset (addressoffset) within the memory 20, 28 indicating the memory line 70 being stored in the cache line 90. Finally, a sixth field 102 is used to store the data corresponding to the memory line data 78, once the data has been cached. This structure for the cache line 90 is particularly advantageously because, when used with the memory line structure described above, it allows the memory and cache lines 70, 90 to be converted from a read-only or read/write status according to the uses of the processors 12, 14, 16, 18 and according to the present invention in a highly efficient manner.

Figure 3:
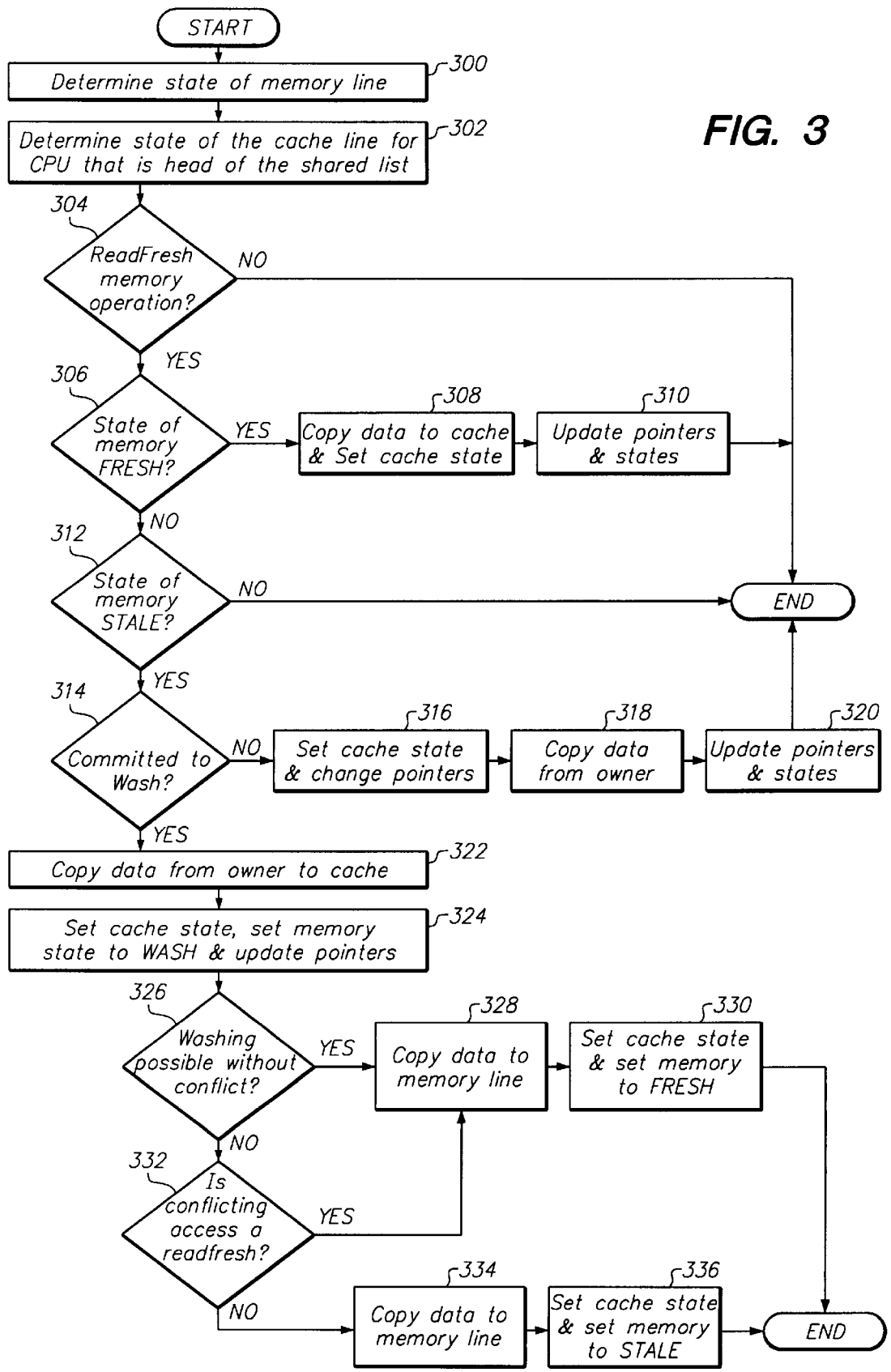
FIG. 3 is a flow chart showing a preferred method for automatically changing the state of a memory line from read/write or owned to read-only or fresh.

Referring now to FIG. 3, the preferred method for automatically changing the state of a memory line 70 from read/write or owned to read-only or fresh will be described. Under the method of the present invention, a scheme is set up such that various read and write operations will change the state of memory and create copies of memory lines 70 that have one of two possible states: owned (which means the owning processor has the right to read and modify the data for the memory line) and fresh (which means the processor only has the right to read data for the memory line, and other read-only copies may exist). The present invention automatically and reliably converts the memory lines from owned to fresh and advantageously converts an owned data line to fresh when read fresh accesses are being performed, while correctly leaving the line in an owned state if additional read owned access occur. This advantageously maximizes the efficiency of memory operations, and minimizes the conversion complexity and operations. Still more particularly, the present invention operates similar to existing systems for memory operations other than a read fresh operation, a operation where a processor 12 requests a fresh copy of a memory line from the memory 20. For the read fresh operations, the present invention advantageously evaluates whether to convert memory lines from the owned to fresh state and also determines whether it is appropriate to wash the memory line to convert the memory line from stale or lost state to a fresh state.

As shown in FIG. 3, the preferred method of the present invention only affects memory operations, and begins in step 300 by determining the state of the memory line 70 that is the target of the memory operation. Next in step 302, the state of the cache line for the processor that is head of the share list, if any, is determined. Then in step 304, the method determines whether the memory operation is a "read fresh" memory operation. If the memory operation is not a read fresh memory operation, the preferred method completes the operation in a conventional manner such as for read owned operation and other types of memory operations known to those skilled in the art. After completion of the non-read fresh memory operation, the method is complete and ends, thus, having only nominal impact when non-read fresh memory operations are executed. If however, the operation is a read fresh memory operation, the method continues in step 306.

In step 306, the method determines whether the state of the memory line 70 for the memory operation is FRESH. If the state of the memory line 70 is not FRESH, the method continues in step 312. However, if the state of the memory line 70 is FRESH, the process continues in step 308. In step 308, the method copies the data from the memory line 70 to the cache of the requesting processor and updates the cache state. This is particularly advantageous because after step 308 the data becomes usable by the requesting processor, and no state change is required for the memory line. The requesting processor then in step 310 updates the pointers for memory and the cache line that is head of the sharing list (the list of processors sharing the data of the memory line) and the state of the cache line that is head of the sharing list.

Figure 4A:
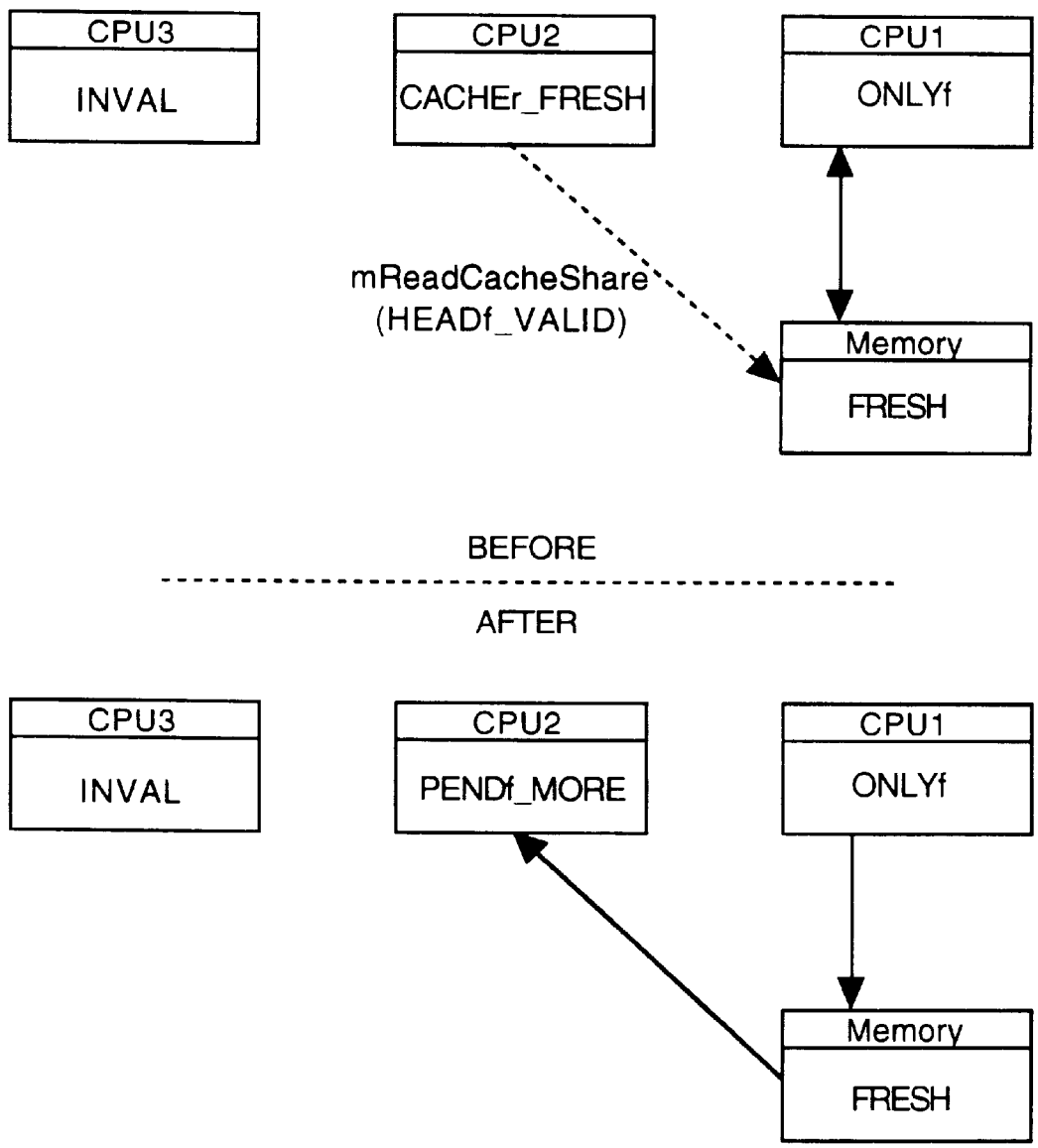
FIGS. 4A and 4B are block diagrams showing the memory line state, cache lines states and pointers during execution of a process for creating a read only copy of the memory line where other read-only copies already exist.
Figure 4B:
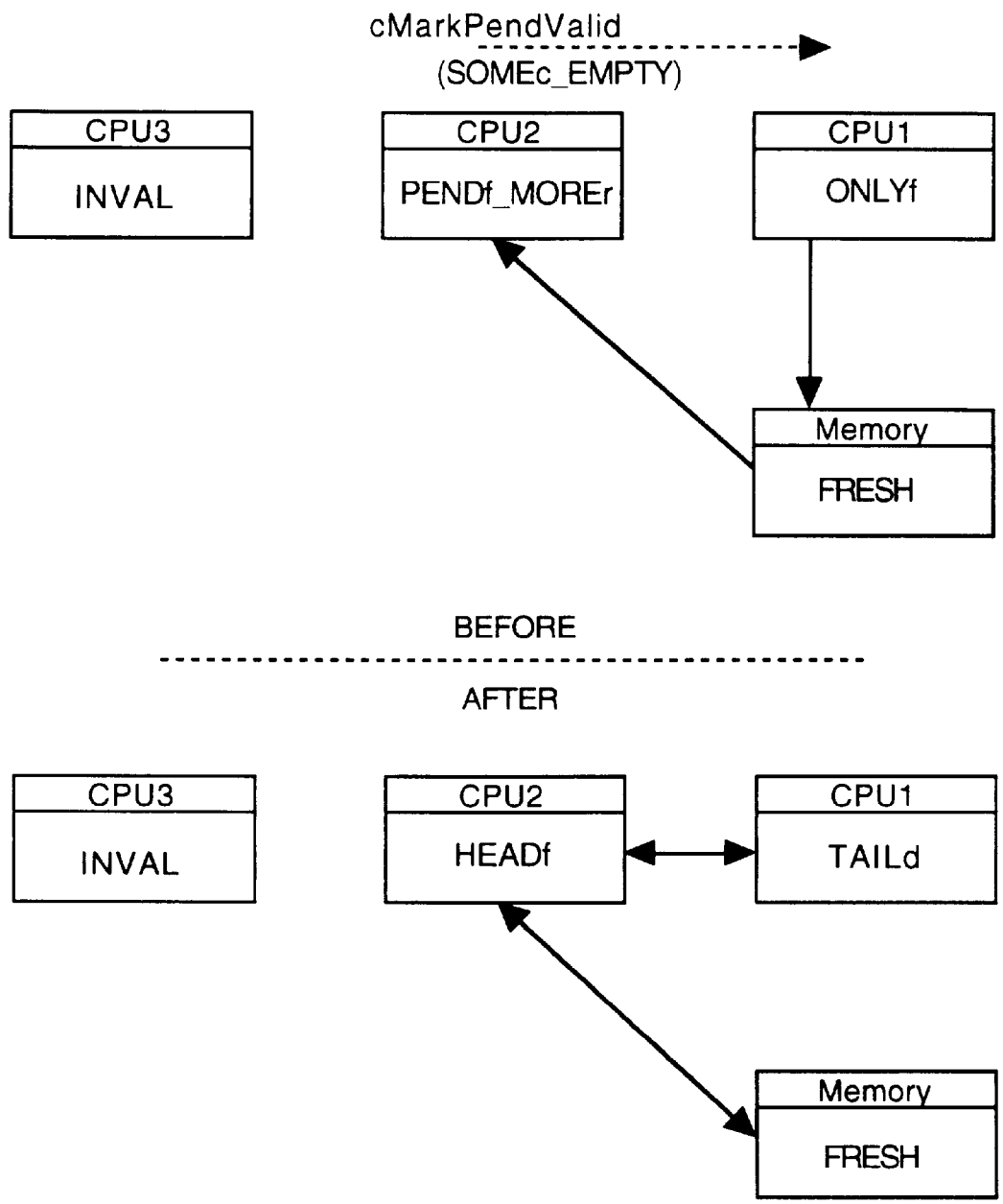

The operation of steps 306, 308 and 310 can best be understood from the before and after diagrams of FIGS. 4A and 4B. The diagrams of FIGS. 4A and 4B illustrate three processors (CPU1, CPU2, CPU3) and a memory, and the pointers, cache state, and memory state as a read fresh memory operation is executed for a memory line. Before the read fresh memory operation, the memory state is fresh and a single read-only copy is stored in the cache of CPU1. The state of the cache line is ONLYf indicating that it is the only read-only copy existing. The pointers for the cache line of CPU1 and for the memory point to each other. As the read fresh memory operation begins, as indicated by the dotted line, the memory 20 responds with a HEADfVALID signal, an address and the data. This indicates that the data is valid and that there is another cache line that has a read-only copy of the data. Then CPU2 updates its cache line state to PENDf MORE, and memory updates the fwdID pointer for the memory line to point to the cache line of CPU2, as shown by the after portion of FIG. 4A. The PENDfMORE state for the cache line of CPU2 indicates that pointers for the shared list need to be completed and the other cache line may have more data. Next, CPU2 issues the cMarkPendValid command to CPU1, and CPU1 responds with a SOMEcEMPTY, as shown in the before portion of FIG. 4B. This causes CPU1 to change the state of the cache line to TAILd, indicating that it is the end of the sharing list, and updates the backward ID for the cache line to point to the cache line of CPU2. Similarly, CPU2 changes the state of its cache line to HEADf, indicating that it is the head of a sharing list of fresh copies. CPU2 also changes the fourth field 98 (memID) for the cache line to point to memory line and changes the second field 94 (forward ID) to point to the cache line of CPU1, as shown in the after portion of FIG. 4B.

Referring back to FIG. 3, the method continues in step 312 if the state of the memory is not FRESH. In step 312, the method tests whether the state of memory is STALE. If the state of the memory is not STALE, the method is complete and ends. On the other hand, if the state of the memory is STALE, the method continues to step 314. In step 314, the method tests whether the requesting CPU is committed to wash the stale memory line. This is determined according to the read operation requested by the CPU. If the CPU issues a mReadCacheFresh, this indicate that a read fresh memory operation is to be performed, and the CPU is obligated to wash the memory line if it is stale. If the CPU issues a mReadCacheShare, this indicates that a read fresh memory operation is to be performed, but that the CPU is not obligated to wash the memory line if it is stale. Thus, the method can determine whether the processor has committed to washing the memory line by testing the command that was first sent by the requesting CPU.

If the method determines that the requesting CPU is not committed to wash the stale memory line, the process continues and basically retrieves the data from the cache line/processor that holds the fresh data and copies the data to the cache line of the requesting processor. In particular, in step 316, the method updates the state of the cache line for the requesting processor and changes the pointer of memory to point to the cache line for the requesting processor. Next in step 318, the data is copied from the CPU owning the data to the cache line of the requesting processor. Then in step 320, the pointers for the requesting processor are modified to point to the memory line and the cache line of the CPU owning the data. Also, the pointer of the CPU owning the data is updated to specify the cache line of the requesting processor.

Figure 5A:
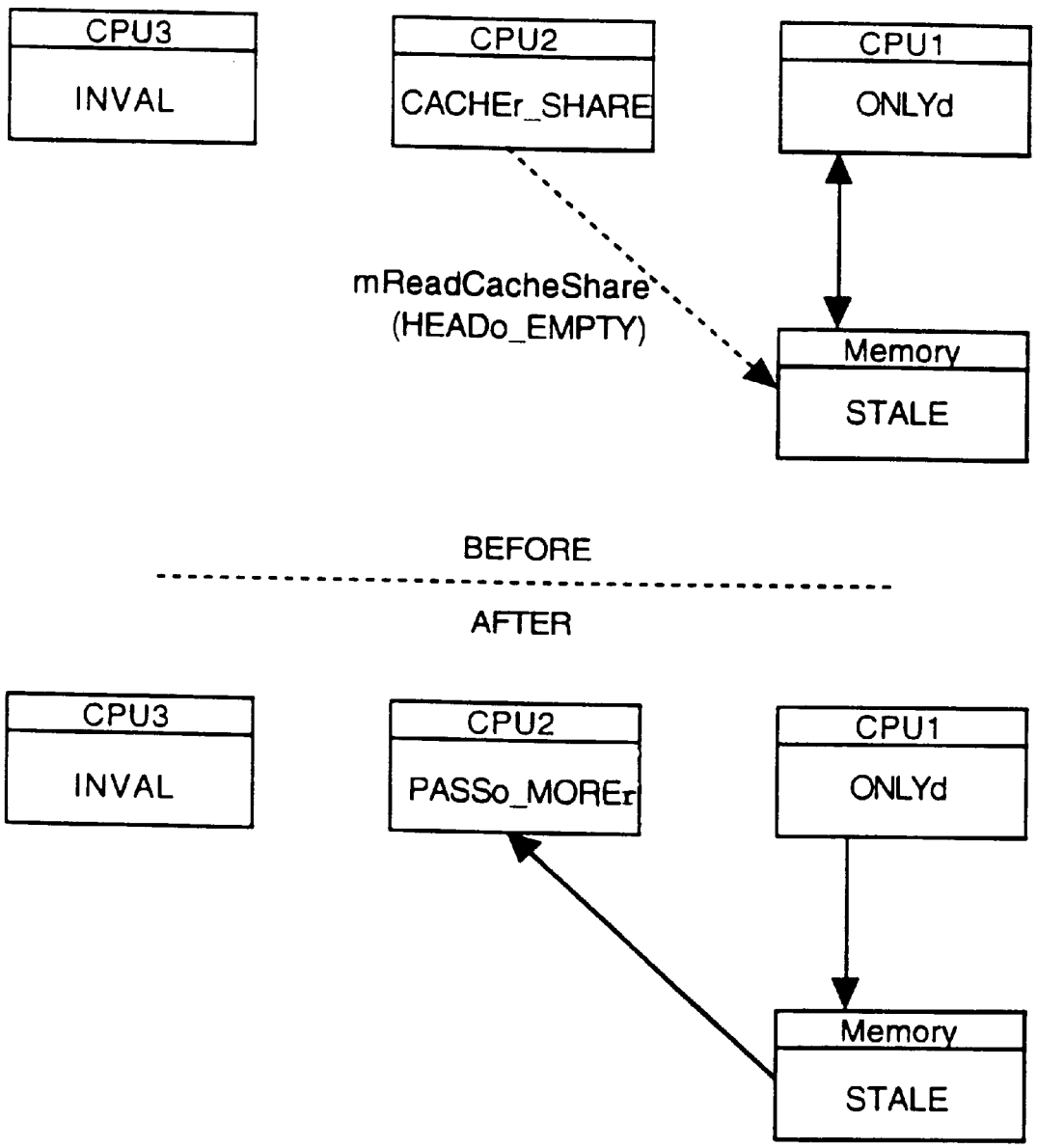
FIGS. 5A and 5B are block diagrams showing the memory line state, cache lines states and pointers during execution of a process for creating a read only copy of the memory line where the memory line does not hold the data and another owned copy already exists.
Figure 5B:
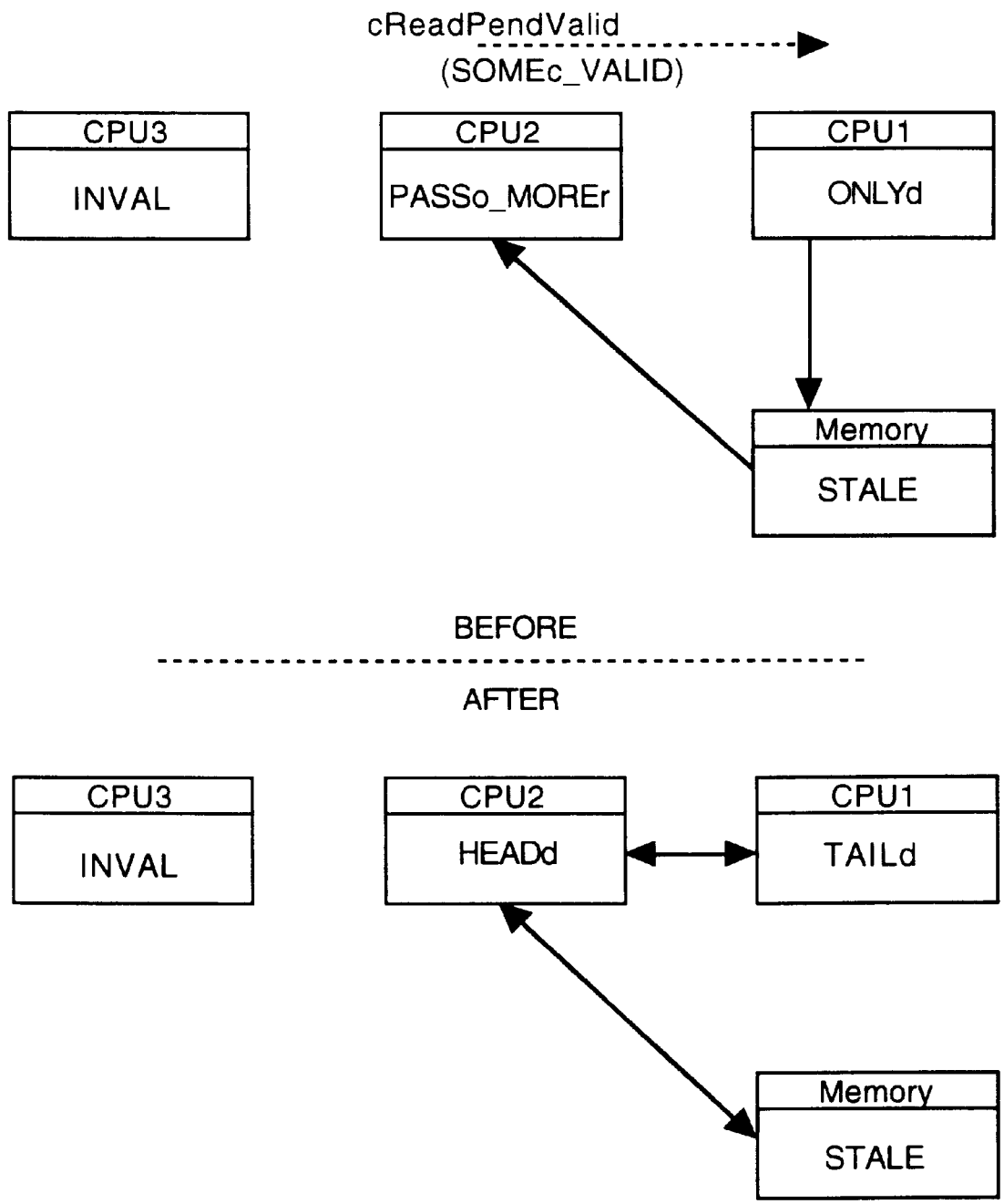

The process described in steps 314, 316, 318, 320 can best be understood with the before and after diagrams of FIGS. 5A and 5B. The diagrams of FIGS. 5A and 5B illustrate three processors (CPU1, CPU2, CPU3) and a memory, and the pointers, cache state, and memory state as a read fresh memory operation is executed for a memory line. Before the read fresh memory operation, the memory state is STALE and a single owned copy is stored in the cache of CPU1. The state of the cache line for CPU is ONLYd indicating that it is the only owned copy. The pointers for the cache line of CPU1 and for the memory point to each other. As the read fresh memory operation (mReadCacheShare) begins, as indicated by the dotted line, the memory 20 responds with a HEADoEMPTY signal and an address. This indicates that the data is not valid and that there is another cache line that has is the head of a shared list and owns the data. Then CPU2 updates its cache line state to PASSoMOREr, and memory updates the fwdID pointer for the memory line to point to the cache line of CPU2, as shown by the after portion of FIG. 5A. The PASSoMOREr state for the cache line of CPU2 indicates that the data must be retrieved from the owner and that pointers for the shared list need to be completed. Next, CPU 2 issues the cMarkPendValid command to CPU1, and CPU1 responds with a SOMEcVALID, as shown in the before portion of FIG. 5B. The SOMEcVALID indicates that the cache line has valid data. This causes CPU1 to change the state of the cache line to TAILd, indicating that it is the end of the sharing list, to transfer the data to the cache line of CPU2, and to update the backward ID for the cache line to point to the cache line of CPU2. Similarly, CPU2 changes the state of its cache line to HEADd, indicating that it is the head of a sharing list and owns the data. CPU2 also changes the fourth field 98 (memID) for the cache line to point to memory line and changes the second field 94 (forwardID) to point to the cache line of CPU1, as shown in the after portion of FIG. 5B.

Referring again to FIG. 3, when the processor commits to washing the memory line, the method continues from step 314 to step 322. In step 322, the data is copied from the owner/holder of the data to the cache line of the requesting processor. Then in step 324, the state of the cache line of the requesting processor is set to indicate the cache line has valid data, is the head of any shared list that exists, and will wash the memory line. The state of the memory line is also changed to the wash state, indicating the memory line is transitioning from an owned state to a fresh state. Finally, the pointers for the memory line, the requesting processor and the processor that owns the data are updated as well in step 324. Next in step 326, the preferred method determines whether washing can complete without a conflict. If the method determines in step 326 that washing can complete without conflict then the method continues in step 328 by copying the data from the requesting processor's cache line to the memory line. Then in step 330, the state of the memory line is changed to FRESH, and the state of the cache line of the requesting processor is set to indicate the cache line is the head of valid sharing list. The process is then complete and ends having washed the memory line.

Figure 6A:
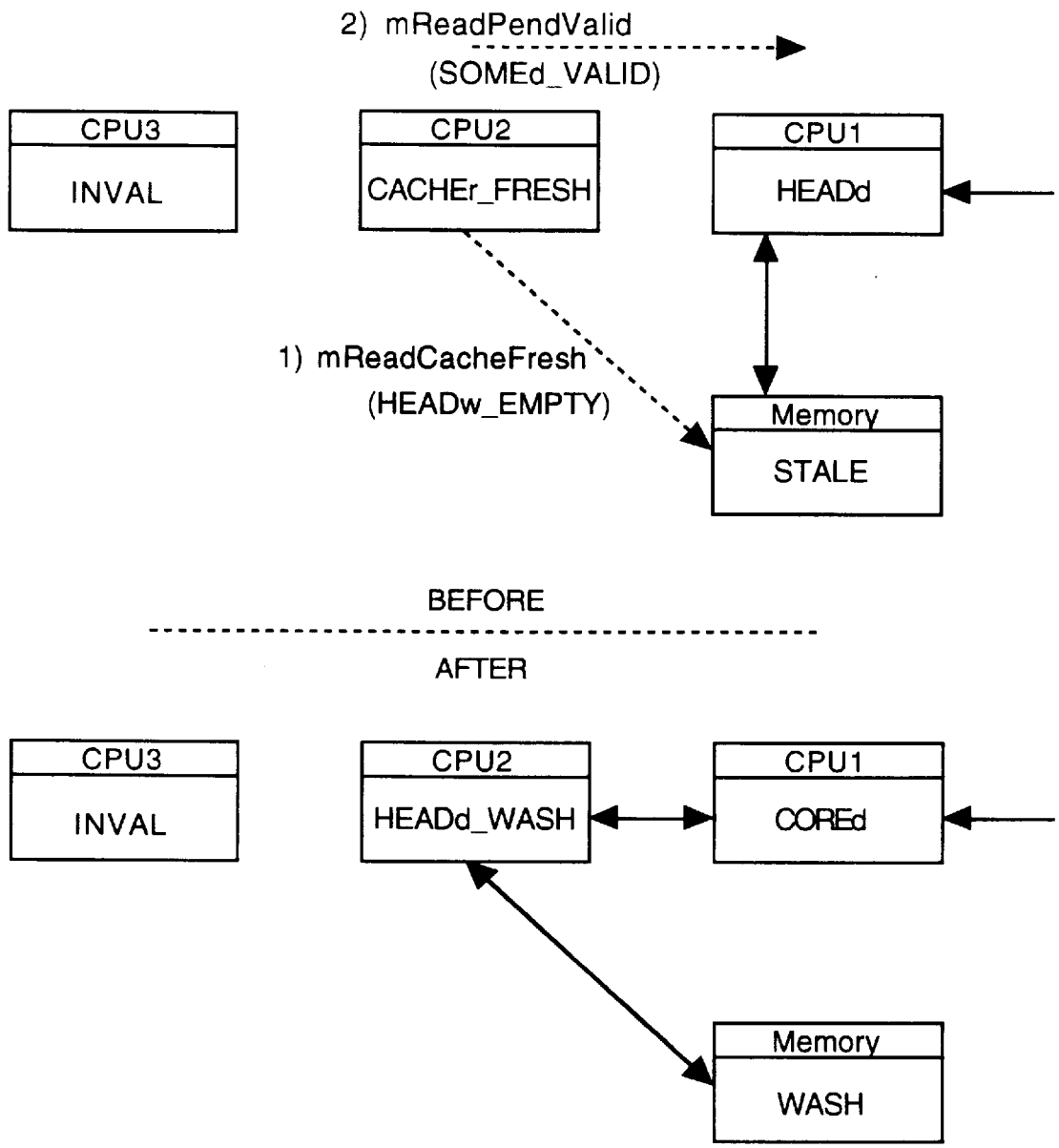
FIGS. 6A and 6B are block diagrams showing the memory line state, cache lines states and pointers during execution of a process for creating a read only copy of the memory line where the memory line does not hold the data, other read only copies exist and an non-conflicting wash can be executed.
Figure 6B:
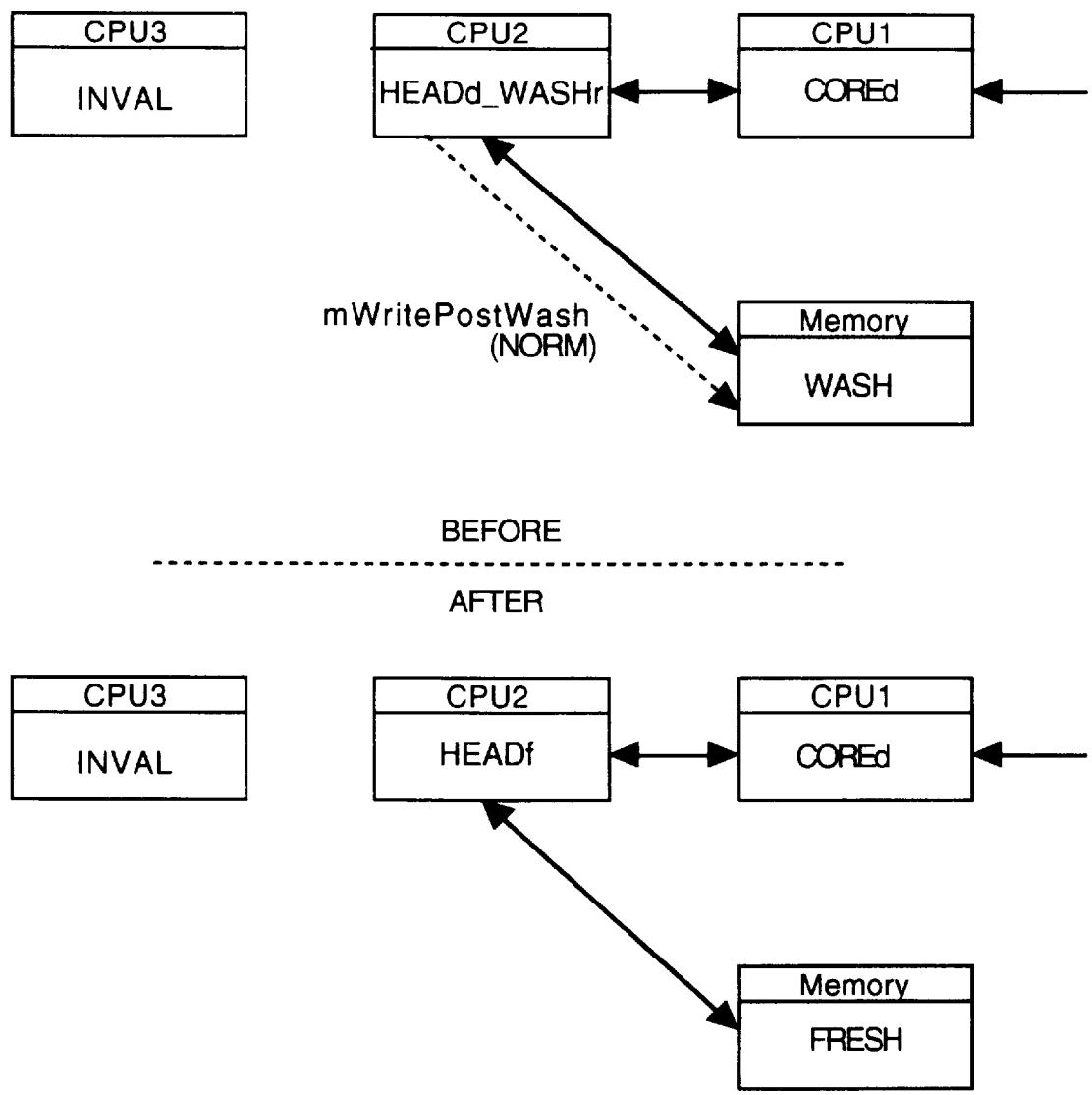

The process described in steps 322, 324, 326, 328, and 330 can best be understood with the before and after diagrams of FIGS. 6A and 6B. The diagrams of FIGS. 6A and 6B illustrate three processors (CPU1, CPU2, CPU3) and a memory, and the pointers, cache state, and memory state as a read fresh memory operation is executed for a memory line. Before the read fresh memory operation, the memory state is STALE and a single owned copy is stored in the cache of CPU1. The state of the cache line for CPU is HEADd indicating that it is the head of a shared list and holds an owned copy. The pointers for the cache line of CPU1 and for the memory point to each other. As the read fresh memory operation (mReadCacheFresh) begins, as indicated by the first dotted line, the memory 20 responds with a HEADwEMPTY signal and an address. This indicates that the data is not valid and that there is another cache line that has is the head of a shared list and owns the data. Then CPU2 updates its cache line state to CACHErFRESH, memory updates the fwdID pointer for the memory line to point to the cache line of CPU2. The CACHErFRESH state for the cache line of CPU2 indicates that the data must be retrieved from the owner and that pointers for the shared list need to be completed. Next, CPU2 issues the mReadPend-Valid command to CPU1, and CPU1 responds with a SOMEdVALID, as shown in the before portion of FIG. 6A. The SOMEdVALID indicates that the cache line has valid data and CPU2 is the new owner of the data. This causes CPU1 to change the state of the cache line to COREd, indicating that it is in but not the end of the sharing list, to transfer the data to the cache line of CPU2, and to update the backward ID for the cache line to point to the cache line of CPU2. Similarly, CPU2 changes the state of its cache line to HEADdWASH, indicating that it is the head of a sharing list, owns the data, and will wash the memory line. CPU2 also changes the fourth field 98 (memID) for the cache line to point to memory line and changes the second field 94 (forward ID) to point to the cache line of CPU1, as shown in the after portion of FIG. 6A. Having committed to wash the memory line, CPU2 then issues the mWritePostWash command to the memory, and changes the state of the cache line to HEADdWASHr as shown by the before portion of FIG. 6B. This cause the memory to return a NORM value indicating that washing can complete without a conflict. The data is then copied to the memory line, the state of the memory line is set to be FRESH, and the state of the cache line for CPU2 is changed to HEADf to indicate the cache line is the head of a shared list.

Referring now to FIG. 3, the remaining steps of the method for automatically changing the state of a memory line from owned to fresh will be described. If it is determined in step 326 that washing cannot complete without a conflict then the method continues in step 332. In step 332, the method determines whether the conflict is being caused by a memory access that is a read fresh operation. If the conflict is caused by a read fresh operation, the method proceeds to step 328 and then 330 as has been described above. An example of this process will also be described below with reference to FIGS. 7A–7C below. However, if the conflict is not caused by a read fresh operation, the method proceeds to step 334 and 336, and washing does not complete. In step 334, the data from the cache line of the processor committed to wash is copied to the memory line. Then the cache state is updated to indicate that the cache line is the head of a shared list, and the memory line state is changed to STALE. Then method is complete. The method disclosed in steps 334, 336 will be described in more detail below with reference to FIG. 8A–8C below.

Figure 7A:
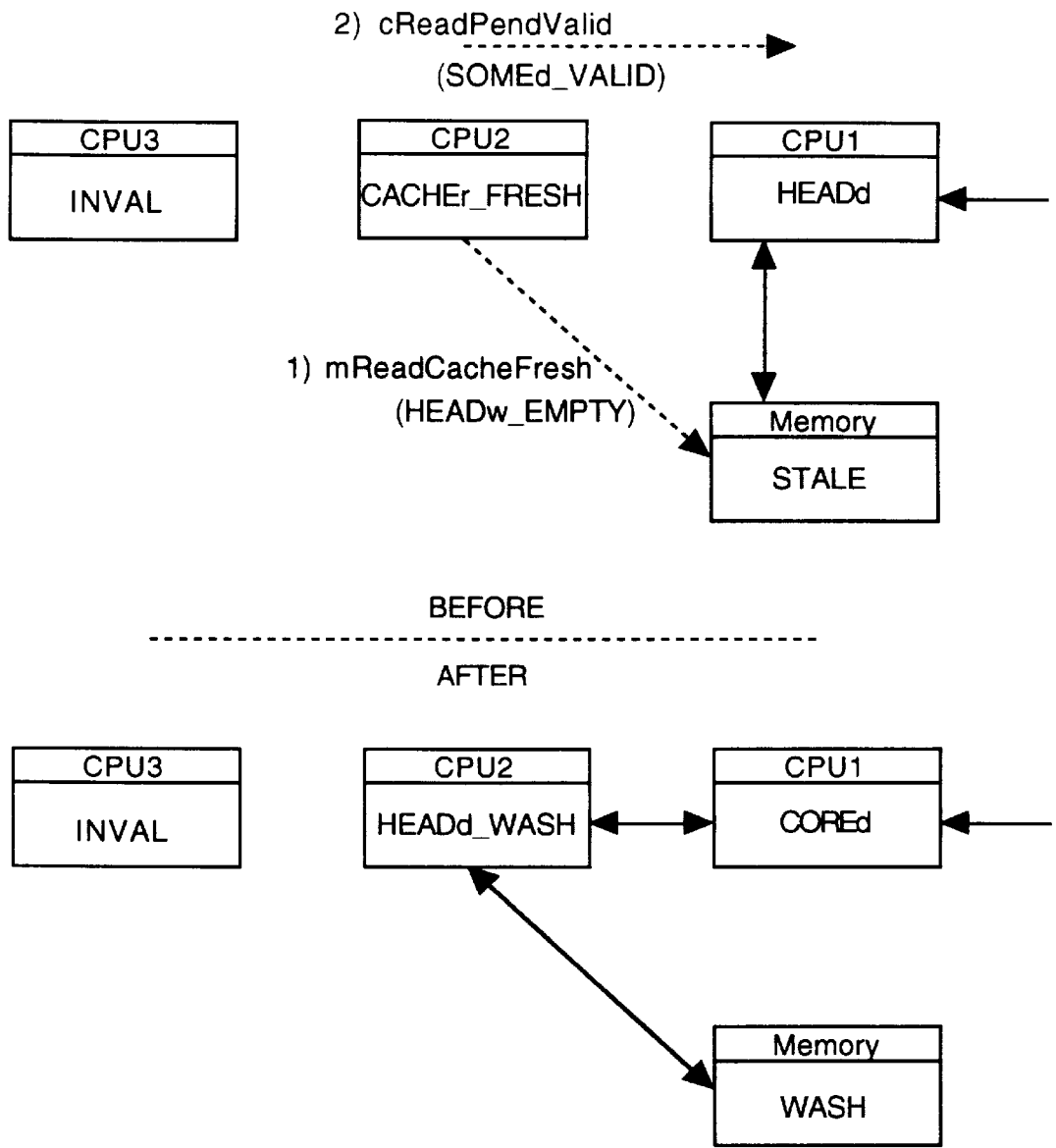
FIGS. 7A, 7B and 7C are block diagrams showing the memory line state, cache lines states and pointers during execution of a process for creating a read only copy of the memory line where the memory line does not hold the data, other read only copies exist and there is a conflict in washing.
Figure 7B:
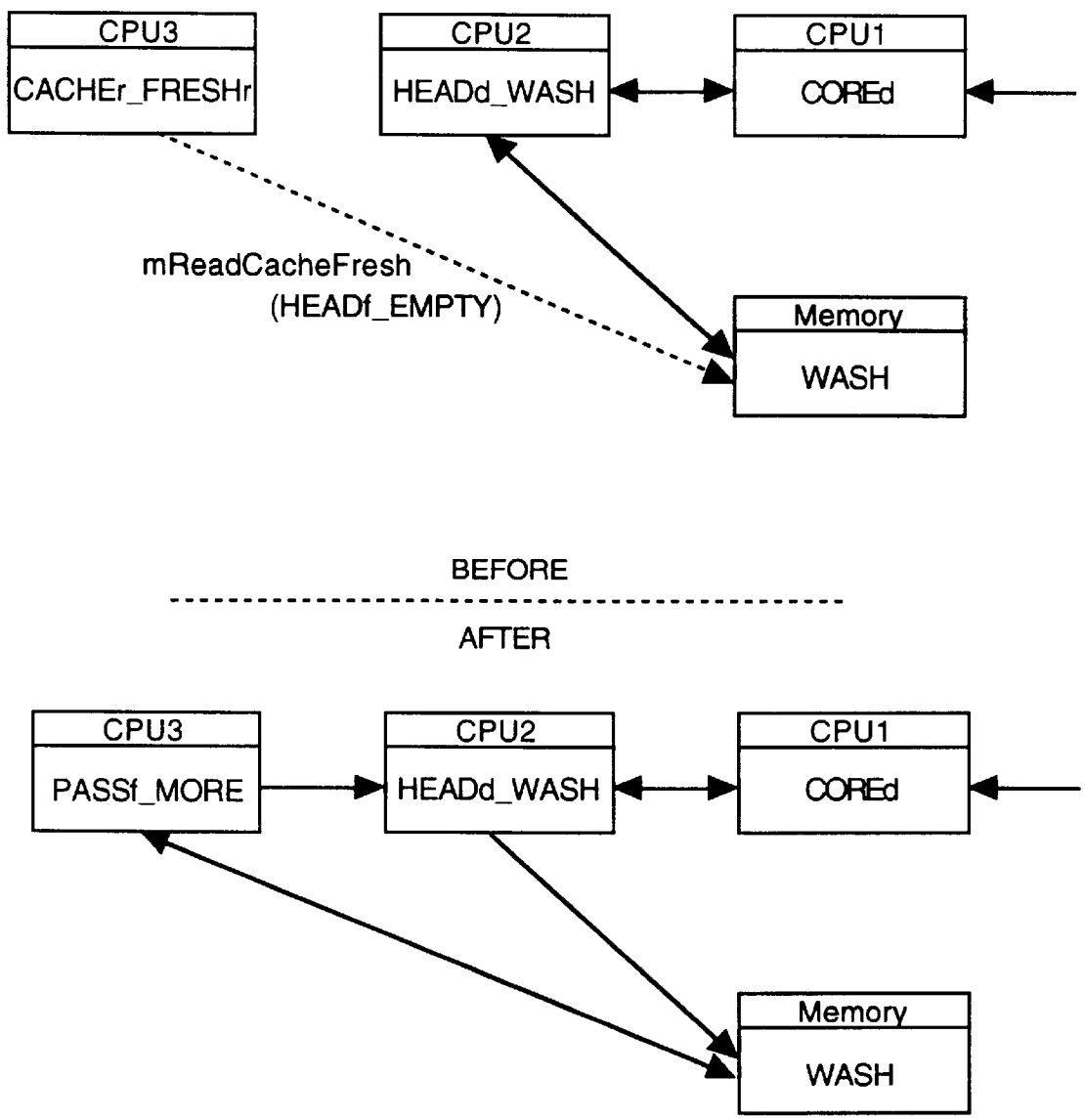
Figure 7C:
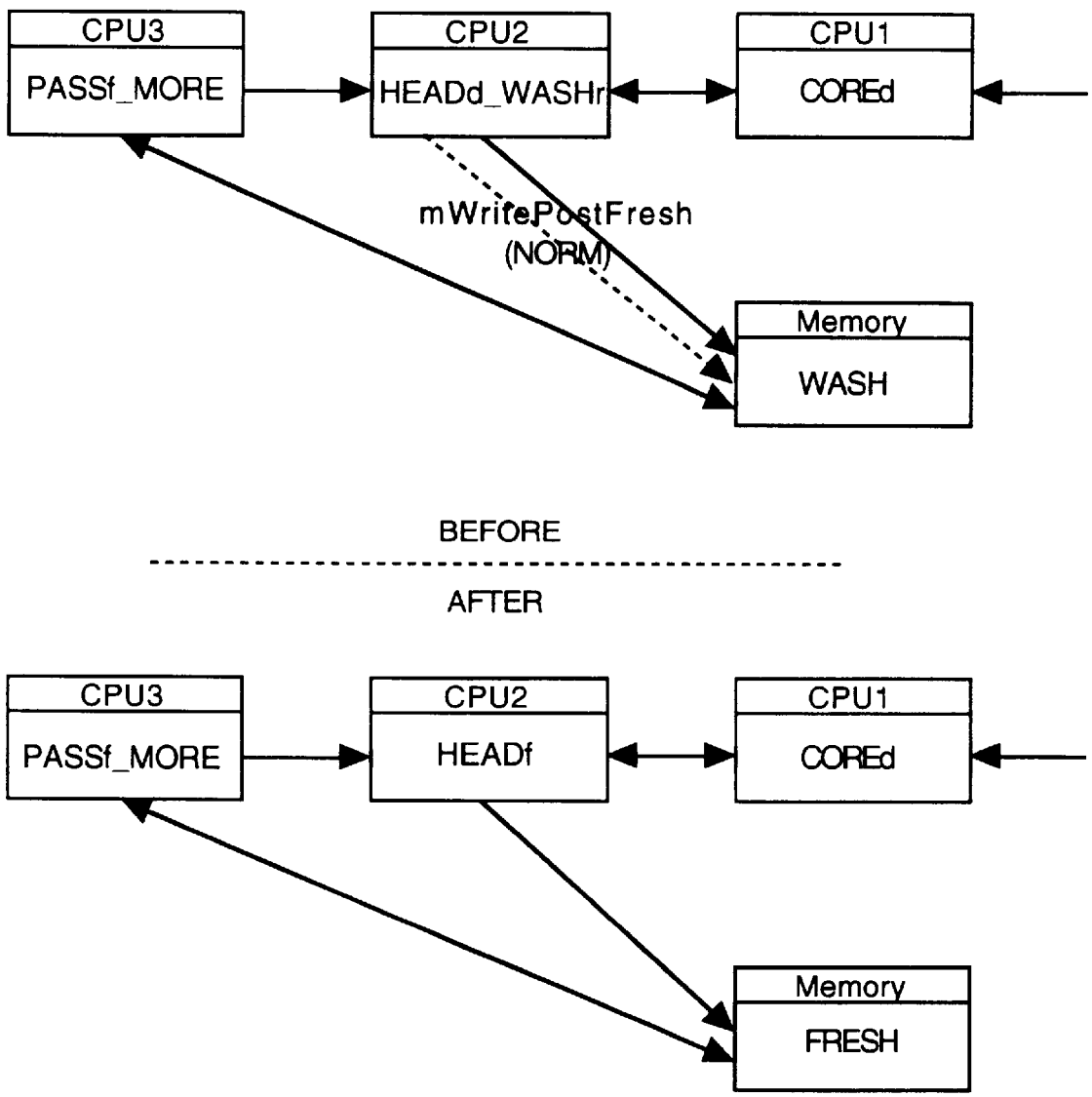

Referring now to FIGS. 7A–7C, the preferred process for performing washing according to the present invention where a conflicting read fresh memory operation has occurred will now be described. The process described in steps 322, 324, 326, 332, 328, and 330 can best be understood with the before and after diagrams of FIGS. 7A–7C. The diagrams of FIGS. 7A–7C illustrate three processors (CPU1, CPU2, CPU3) and a memory, and the pointers, cache state, and memory state as a read fresh memory operation is execute for a memory line. As shown in FIG. 7A, the process begins with memory state in a STALE state, and a single owned copy is stored in the cache of CPU1. After a read fresh memory operation (mReadCacheFresh), as indicated by the first dotted line, and a data transfer operation (mReadPendValid), CPU1 cache line has a state of COREd, and to the backward ID for the cache line points to the cache line of CPU2. CPU2 cache line has a state of HEADdWASH, and its memID points to the memory line and forwardID points to the cache line of CPU1. This is identical as been described above with reference to FIG. 6A. However, as shown in the before portion of FIG. 7B, CPU3 issues a read fresh memory operation (mReadCacheFresh) before the washing by CPU2 can complete. In response to the mReadCacheFresh, the memory responds with a HEADf EMPTY state indicating that the CPU3 cache line is now the head of a shared list, but the memory line does not have valid data. The memory also provides an address to the CPU2 cache line so that CPU3 can retrieve the data. The memory line pointer is changed to point to the cache line of CPU3, the memID pointer of CPU3 cache line is changed to point to the memory line, and the forwardID pointer of CPU3 is changed to point to the cache line of CPU2. The state of the cache line of CPU3 is also changed to PASSfMORE, as shown by the after portion of FIG. 7B. Then as shown in FIG. 7C, the washing completes as described for step 328 and 330 after step 332. In particular, CPU2 then issues the mWritePostWash command to the memory, and changes the state of the cache line to HEADdWASHr as shown by the before portion of FIG. 7C. This causes the memory to return a NORM value indicating that washing can complete without a conflict. The data is then copied to the memory line, the state of the memory line is set to be FRESH, and the state of the cache line for CPU2 is changed to HEADf to indicate the cache line is the head of a shared list. The states of the CPU cache lines and the memory lines, and the pointers are shown in the after portion of FIG. 7C. Then cache line of CPU3 can transition to the state of HEADf as has been described above.

Figure 8A:
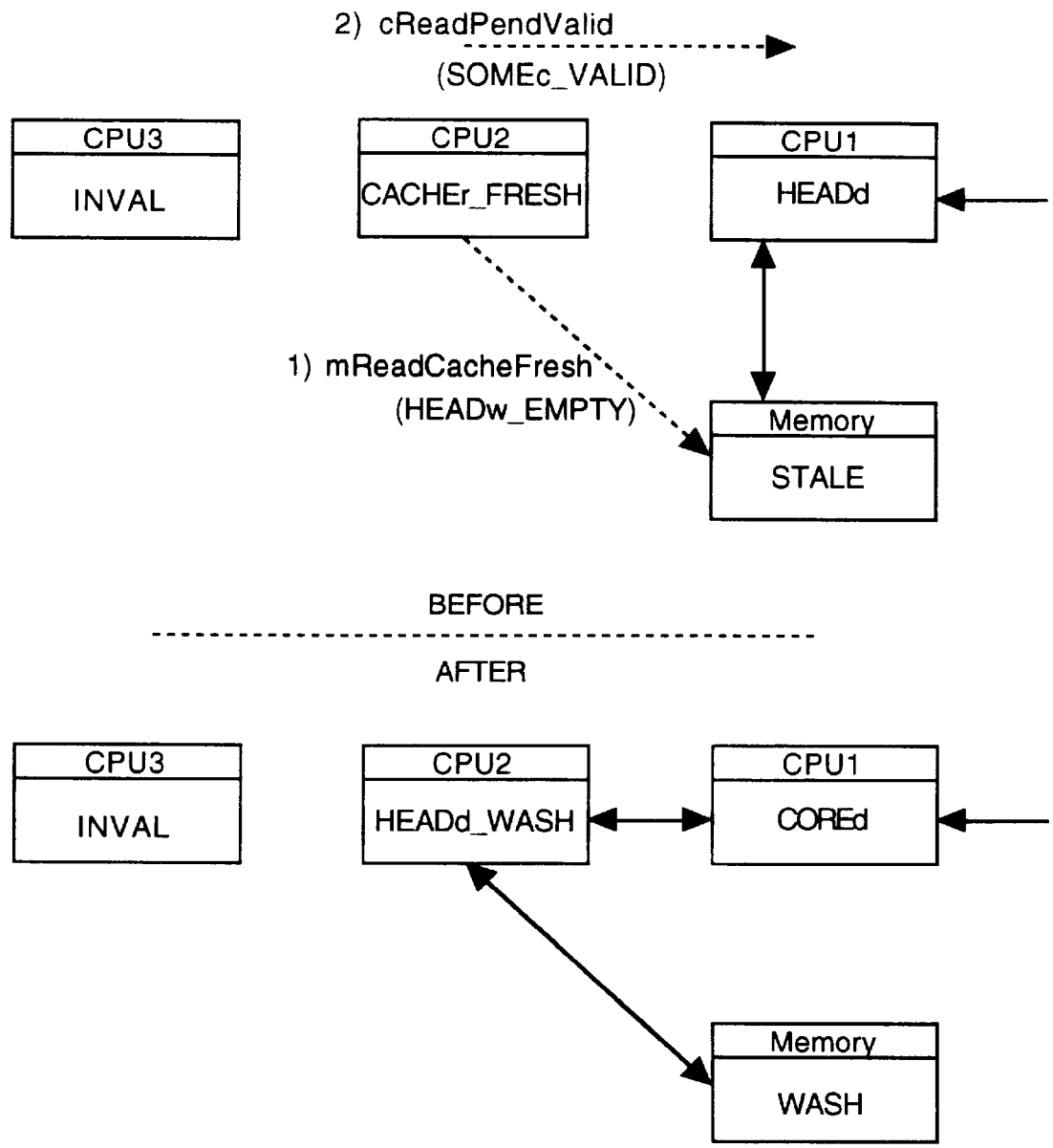
FIGS. 8A, 8B and 8C are block diagrams showing the memory line state, cache lines states and pointers during execution of a process for creating a read only copy of the memory line where a conflicting read owned process begins before washing can complete.
Figure 8B:
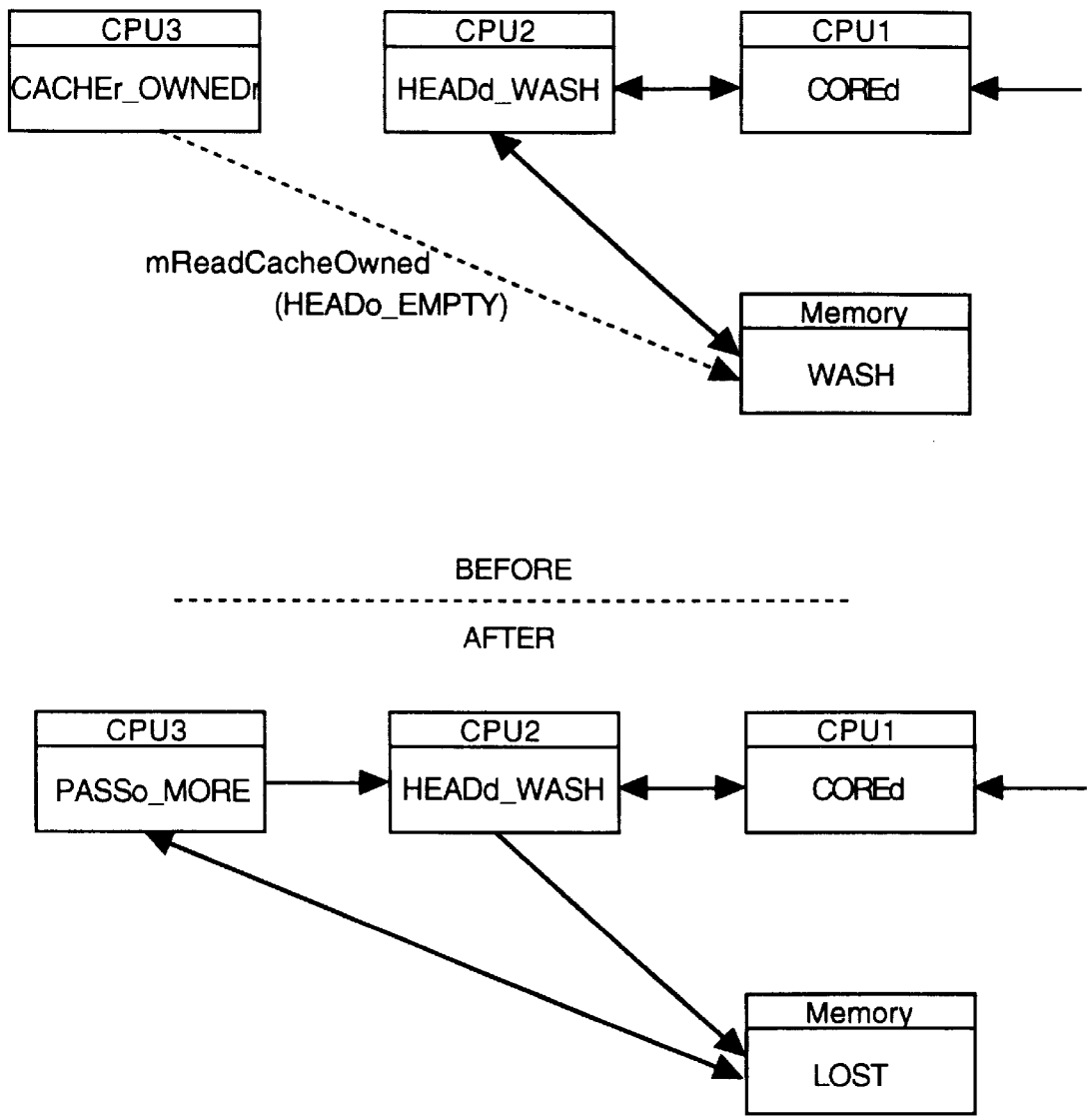
Figure 8C:
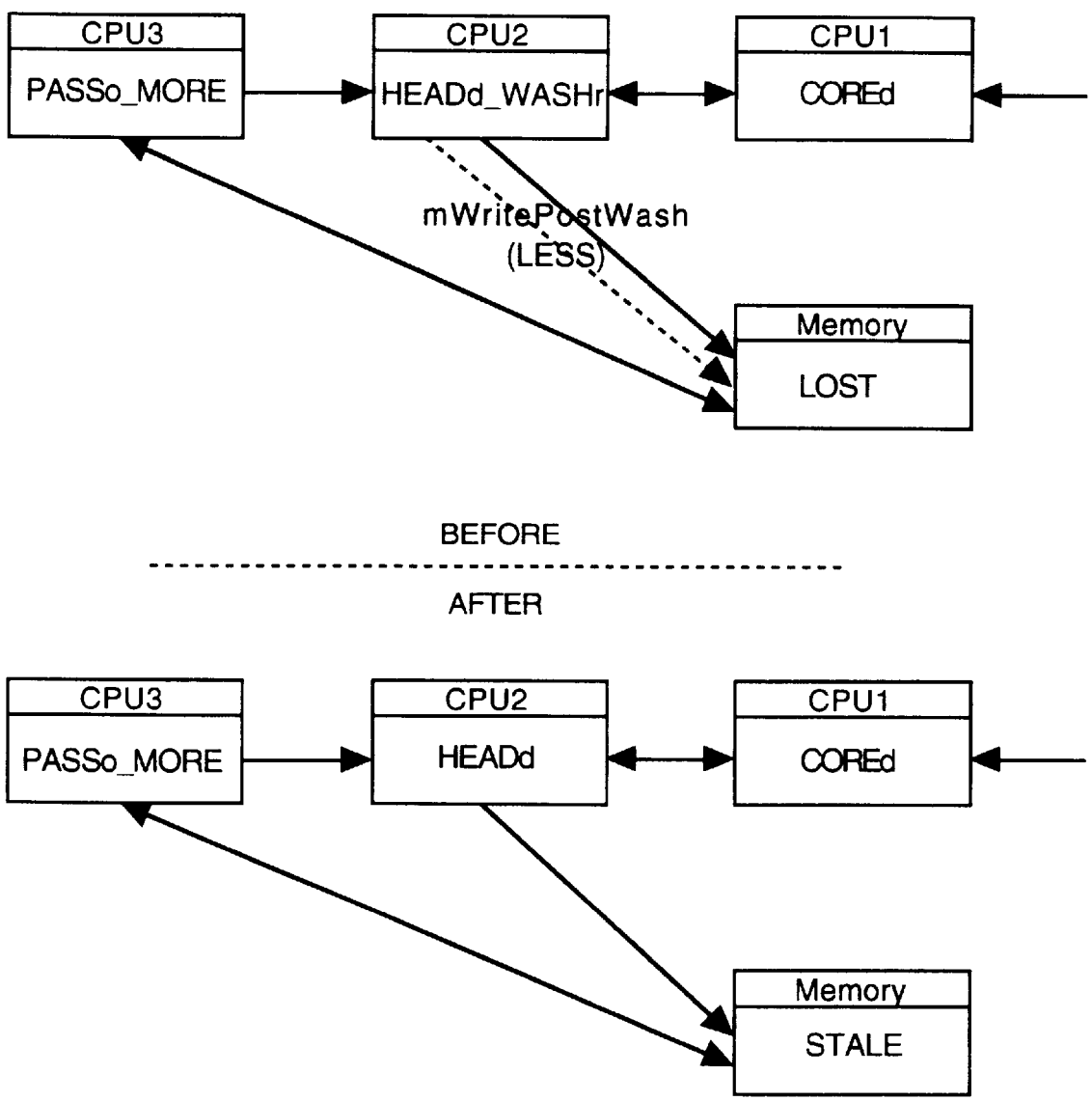

Referring now to FIGS. 8A–8C, the process for aborting washing according to the present invention where a conflicting memory operation has occurred will now be described. The process described in steps 322, 324, 326, 332, 334, and 336 can best be understood with the before and after diagrams of FIGS. 8A–8C. The diagrams of FIGS. 8A–8C again illustrate three processors (CPU1, CPU2, CPU 3) and a memory, and the pointers, cache state, and memory state as a read fresh memory operation is executed for a memory line. As shown in FIG. 8A, the process begins with memory state in a STALE state, and a single owned copy is stored in the cache of CPU1. After a read fresh memory operation (mReadCacheFresh), as indicated by a first dotted line, and a data transfer operation (mReadPendValid), as indicated by a second dotted line, CPU1 cache line has a state of COREd, and the backward ID for the cache line points to the cache line of CPU2. CPU2 cache line has a state of HEADdWASH, and its memID points to the memory line and its forward ID points to the cache line of CPU1. This is identical as been described above with reference to FIG. 7A.

As shown in the before portion of FIG. 8B, CPU3 issues a read owned memory operation (mReadCacheOwned) before the washing by CPU2 can complete. In response to the mReadCacheOwned, the memory responds with a HEADoEMPTY state indicating that the CPU3 cache line is now the owner and head of a shared list, but the memory line does not have valid data. The memory also provides an address to CPU2 cache line so that CPU3 can retrieve the data. The memory line pointer is changed to point to the cache line of CPU3, the memID pointer of CPU3 cache line is changed to point to the memory line, and the forwardID pointer of CPU3 is changed to point to the cache line of CPU2. The state of the cache line of CPU3 is also changed to PASSoMORE, as shown by the after portion of FIG. 8B. The state of the memory line is also modified to be LOST. Then as shown in FIG. 8C, the washing is aborted after marking the memory line STALE as described for steps 334 and 336. In particular, CPU2 then issues the mWritePostWash command to the memory, and changes the state of the cache line to HEADd as shown by the before portion of FIG. 8C. The memory responds with a LESS value, indicating that a conflicting memory operation has occurred and that washing must be aborted. The data is then copied to the memory line, the state of the memory line is set to be STALE, and the state of the cache line for CPU2 is changed to HEADd to indicate the cache line is the head of a shared list, and the owner. The states of the CPU cache lines and the memory lines, and the pointers are shown in the after portion of FIG. 8C.

While the present invention has been described with reference to certain preferred embodiments, those skilled in the art will recognize that various modifications may be provided. These and other variations upon and modifications to the preferred embodiments are provided for by the present invention.

Appendix A - Memory States

| Name | Description |
| --- | --- |
| FRESH | copies not modifiable and the same as memory |
| LOST | washed - conflict detected |
| STALE | sharing-list copy is modifiable and may be different from memory |
| WASH | transitional state (OWNED to FRESH) - List is being washed, no conflict has been detected |
| HOME | no copy anywhere |

What is claimed is:

1. A method of reliably changing states of caches and a memory from read/write to read-only, the method comprising the steps of:

initiating a memory access operation for a line of a memory;

determining a state of the line of memory;

determining whether the state of the memory line can be converted to read-only without conflict;

converting the state of the memory line to read-only if the memory line can be converted to read-only without conflict; and converting the state of the memory line to STALE if the memory line cannot be converting to read-only without conflict.

2. The method of claim 1, further comprising the steps of:

determining whether the memory access operation initiated is a request to create a read-only copy;

aborting the steps of determining whether the state of the memory line can be converted, converting the state of the memory line to read-only, converting the state of the memory line to STALE, if the memory access operation initiated is not a request to create a read-only copy.

3. The method of claim 1, further comprising the steps of:

determining whether the state of the memory line is FRESH;

if the state of the memory line is FRESH
copying data from the memory line to a cache line of a requesting processor;
updating a state of the cache line; and
updating pointers for the memory line and the cache line.

4. The method of claim 1, further comprising the steps of:

determining whether the state of the memory line is STALE aborting the steps of determining whether the state of the memory line can be converted, converting the state of the memory line to read-only, converting the state of the memory line to STALE, if the state of the memory line in not STALE.

5. The method of claim 1, further comprising the step of:

determining whether the memory access operation included a commitment to convert the memory line;

if the memory access operation did not include a commitment to convert the memory line, further performing the steps of:
retrieving data for the memory line from a cache line that holds fresh data; and
copying the data to a cache line of a processor that initiated the memory access operation.

6. The method of claim 1, further comprising the steps of:

determining whether the memory access operation included a commitment to convert the memory line;

if the memory access operation did not include a commitment to convert the memory line, further performing the steps of:
determining a first processor that initiated the memory access operation;
determining a second processor that hold valid data in a cache of the second processor;
updating a state of a cache line for the first processor;
changing a pointer of the memory line to point to the cache line of the first processor;
copying data from a second processor cache line to the first processor cache line; and
modifying the pointers for the first processor to point to the memory line and the second processor cache line.

7. The method of claim 1, further comprising the steps of:

determining whether the memory access operation included a commitment to convert the memory line;

if the memory access operation did include a commitment to convert the memory line, further performing the steps of:
retrieving data for the memory line from a cache line that holds fresh data;
copying the data to a cache line of a processor that initiated the memory access operation; and
setting the memory state to wash.

8. The method of claim 1, wherein the step of determining whether the state of the memory line can be converted to read-only without conflict includes testing whether a conflicting memory access operation is a request to create another read-only copy.

9. A memory system for reliably changing states of caches and a memory from read/write to read-only in a computer system having a plurality of processors, the memory system comprising:

a memory device having inputs and outputs for receiving and outputting data, the memory device having a plurality of memory lines, each memory line having a first portion for storing a state of the memory line, a second portion for storing an address to a cache line, and a third portion for storing data, the state of the memory line being changeable between a read-only state and a read/write state responsive to the presence or absence of conflicts; and a first cache associated with one of the plurality of processors, the first cache having inputs and outputs for receiving and outputting data, the first cache having a plurality of cache lines, each cache line having a first portion for storing a state of the cache line, a second portion for storing an address to another cache line, a third portion for storing an address to a memory line, and a fourth portion for storing data.

10. The memory system of claim 9 further comprising a second cache associated with one of the plurality of processors, the second cache having inputs and outputs for receiving and outputting data, the second cache having a plurality of cache lines, each cache line having a first portion for storing a state of the cache line, a second portion for storing an address to another cache line, a third portion for storing an address to a memory line, and a fourth portion for storing data.

11. The memory system of claim 9, wherein the first cache further comprises a fifth portion for storing an address offset to a memory line.

12. The memory system of claim 11, wherein the first cache further comprises a sixth portion for storing an memory identification number.

* * * * *

UNITED STATES PATENT AND TRADEMARK OFFICE
CERTIFICATE OF CORRECTION

PATENT NO.: 6,035,376

DATED: March 7, 2000

INVENTOR: David V. James

It is certified that errors appear in the above-identified patent and that said Letters Patent is hereby corrected as shown below:

Column 11, line 2, replace "converting" with --converted--.

Column 11, line 29, replace "in not" with --is not--.

Column 11, line 30, replace "step" with --steps--.

Column 12, line 53, replace "an" with --a--.

Signed and Sealed this

Twentieth Day of February, 2001

Attest:

NICHOLAS P. GODICI

*Attesting Officer*  *Acting Director of the United States Patent and Trademark Office*